US010306729B2

(12) United States Patent
Chen et al.

(10) Patent No.: US 10,306,729 B2
(45) Date of Patent: May 28, 2019

(54) DISPLAY WITH AMBIENT-ADAPTIVE BACKLIGHT COLOR

(71) Applicant: Apple Inc., Cupertino, CA (US)

(72) Inventors: Cheng Chen, San Jose, CA (US); Jiaying Wu, San Jose, CA (US); Lu Zhang, West Lafayette, IN (US); David A. Doyle, San Francisco, CA (US); Christopher E. Glazowski, Los Gatos, CA (US); Adria Fores Herranz, San Jose, CA (US); Chenhua You, San Jose, CA (US); Wei Chen, Palo Alto, CA (US); Jun Qi, Cupertino, CA (US); John Z. Zhong, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/334,094

(22) Filed: Oct. 25, 2016

(65) Prior Publication Data
US 2017/0303365 A1 Oct. 19, 2017

Related U.S. Application Data

(60) Provisional application No. 62/324,514, filed on Apr. 19, 2016.

(51) Int. Cl.
*H05B 33/08* (2006.01)
*G09G 3/34* (2006.01)
*G02F 1/1335* (2006.01)

(52) U.S. Cl.
CPC ....... *H05B 33/0872* (2013.01); *G09G 3/3413* (2013.01); *G02F 1/133621* (2013.01);
(Continued)

(58) Field of Classification Search
CPC .................................................. H05B 33/0872
See application file for complete search history.

(56) References Cited

U.S. PATENT DOCUMENTS

| 7,036,946 B1 * | 5/2006 | Mosier | G02F 1/133617 349/68 |
|---|---|---|---|
| 7,667,170 B2 * | 2/2010 | Jang | G09G 3/3406 250/205 |

(Continued)

OTHER PUBLICATIONS

Oh et al., "Analysis of wide color gamut of green/red bilayered freestanding phosphor film-capped white LEDs for LCD backlight", Optics Express, Jul. 27, 2015, vol. 23, No. 15.

(Continued)

*Primary Examiner* — Douglas W Owens
*Assistant Examiner* — Pedro C Fernandez
(74) *Attorney, Agent, or Firm* — Treyz Law Group, P.C.; Kendall W. Abbasi

(57) ABSTRACT

An electronic device may be provided with a display having a backlight with light sources of different colors. The electronic device may include a color ambient light sensor that measures the color of ambient light and control circuitry that adjusts the color of light emitted from the backlight based on the color of ambient light. The light sources may include at least first and second light-emitting diodes that emit light having different color temperatures. The control circuitry may adjust the intensity of light emitted from the first light-emitting diode relative to the intensity of light emitted from the second light-emitting diode to produce a backlight color that more closely matches the color of ambient light. The first and second light-emitting diodes may include an ultraviolet light-emitting diode die and a blue light-emitting diode die that are mounted in a common semiconductor package.

20 Claims, 11 Drawing Sheets

(52) U.S. Cl.
CPC ............ *G02F 2001/133614* (2013.01); *G09G 2320/0666* (2013.01); *G09G 2360/144* (2013.01)

(56) References Cited

U.S. PATENT DOCUMENTS

| | | | |
|---|---|---|---|
| 7,956,366 B2 | 6/2011 | Hiroyama et al. | |
| 8,154,190 B2* | 4/2012 | Ishii | C09K 11/7734 |
| | | | 313/503 |
| 8,282,238 B2* | 10/2012 | Kim | H01L 25/0753 |
| | | | 362/230 |
| 8,558,782 B2* | 10/2013 | You | G09G 3/3413 |
| | | | 315/309 |
| 2001/0035853 A1 | 11/2001 | Hoelen et al. | |
| 2008/0151143 A1 | 6/2008 | Li et al. | |
| 2008/0245949 A1* | 10/2008 | Morimoto | G01J 1/32 |
| | | | 250/205 |
| 2008/0303918 A1 | 12/2008 | Keithley | |
| 2014/0160754 A1 | 6/2014 | Lee et al. | |
| 2014/0252985 A1* | 9/2014 | Huang | H05B 33/0857 |
| | | | 315/294 |
| 2015/0070337 A1* | 3/2015 | Bell | G09G 3/2003 |
| | | | 345/207 |
| 2015/0179111 A1 | 6/2015 | Chen | |
| 2015/0289339 A1* | 10/2015 | Wu | H05B 33/0872 |
| | | | 315/152 |

OTHER PUBLICATIONS

Wood, "How do white LEDs Work?", Out of the Wood, 2011, pp. 21-24.

\* cited by examiner

| BACKLIGHT SOURCE(S) | INPUT PIXEL VALUES (R, G, B) | OUTPUT PIXEL VALUES IN WARM AMBIENT LIGHT (R, G, B) | OUTPUT PIXEL VALUES IN COOL AMBIENT LIGHT (R, G, B) |
|---|---|---|---|
| ONE COLOR (E.G., D65) | (255, 255, 255) | (255, 210, 155) | (220, 230, 255) |
| TWO COLORS (E.G., D35 AND D90) | (255, 255, 255) | (255, 255, 255) | (225, 255, 255) |

*FIG. 9*

DISPLAY WITH AMBIENT-ADAPTIVE BACKLIGHT COLOR

This application claims the benefit of provisional patent application No. 62/324,514, filed Apr. 19, 2016, which is hereby incorporated by reference herein in its entirety.

BACKGROUND

This relates generally to electronic devices, and, more particularly, to electronic devices with displays.

Electronic devices often include displays. For example, cellular telephones and portable computers often include displays for presenting information to a user.

Liquid crystal displays include a backlight for producing light that is transmitted through a layer of liquid crystal material. Pixels in a liquid crystal display contain thin-film transistors and electrodes for applying electric fields to the liquid crystal material. The strength of the electric field in a pixel controls the polarization state of the liquid crystal material and thereby adjusts the amount of backlight that is transmitted through the pixel.

Backlights often use white light-emitting diodes to produce white light that is filtered through red, green, and blue color filters in the display to produce colored light. In a typical arrangement, each light source in the backlight produces the same hue of white.

Backlights that use light sources of a single color can lead to undesirable display characteristics when displaying shades of white that are different from the white produced by the backlight. To display a warmer white, for example, blue and green pixel values must be significantly reduced relative to red pixel values. This type of excessive pixel value truncation can lead to undesirable brightness loss and display artifacts such as motion blur.

It would therefore be desirable to be able to provide improved displays in electronic devices.

SUMMARY

An electronic device may be provided with a display having a backlight with light sources of different colors. The electronic device may include a color ambient light sensor that measures the color of ambient light and control circuitry that adjusts the color of light emitted from the backlight based on the color of ambient light. The control circuitry may adjust the backlight color to more closely match the ambient light color.

In some embodiments, the control circuitry may adjust the white point and color temperature of the display by adjusting input pixel values and by adjusting the color of light emitted from the backlight. In other embodiments, the control circuitry may adjust the white point and color temperature of the display by only adjusting the color of light emitted from the backlight.

The backlight may include at least first and second light-emitting diodes that emit light having different color temperatures. The first light-emitting diode may, for example, produce warm white light having a color temperature less than 6,500 K and second light-emitting diode may produce cool white light having a color temperature greater than 6,500 K. The control circuitry may adjust the intensity of light emitted from the first light-emitting diode relative to the intensity of light emitted from the second light-emitting diode to produce a backlight color that more closely matches the color of ambient light. For example, in warm ambient light having a color temperature that is closer to the color temperature of the first light-emitting diode than the color temperature of the second light-emitting diode, the control circuitry may increase the intensity of light emitted from the first light-emitting diode relative to the intensity of light emitted from the second light-emitting diode to thereby increase the warmth of the backlight that illuminates the display.

If desired, the first and second light-emitting diodes may include an ultraviolet light-emitting diode die and a blue light-emitting diode die that are mounted in a common semiconductor package. The ultraviolet light-emitting diode die and blue light-emitting diode die may be coated with the same phosphor or may be coated with different phosphors.

BRIEF DESCRIPTION OF THE DRAWINGS

FIG. 9 is a table illustrating how displays with backlights having two or more different color light sources can produce different hues of white with little or no pixel value truncation in accordance with an embodiment.

DETAILED DESCRIPTION

Figure 1:
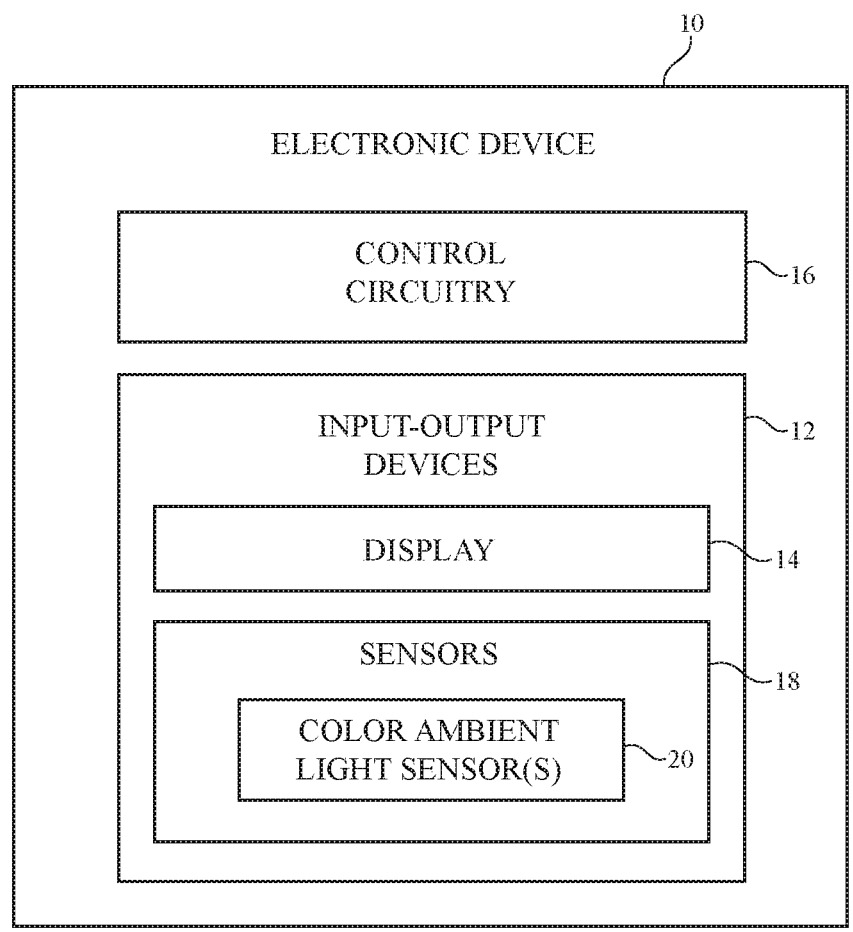
FIG. 1 is a schematic diagram of an illustrative electronic device with a display in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include an ambient light sensor such as color ambient light sensors 20 and other sensors (e.g., a capacitive proximity sensor, a light-based proximity sensor, a magnetic sensor, an accelerometer, a force sensor, a touch sensor, a temperature sensor, a pressure sensor, a compass, a microphone or other sound sensor, or other sensors).

Color ambient light sensor 20 for device 10 may have an array of detectors each of which is provided with a color filter. If desired, the detectors in ambient light sensor 20 may be provided with color filters of different respective colors. Information from the detectors may be used to measure the total amount of ambient light that is present in the vicinity of device 10. For example, the ambient light sensor may be used to determine whether device 10 is in a dark or bright environment. Based on this information, control circuitry 16 can adjust display brightness for display 14 or can take other suitable action.

Ambient light sensors 20 may be used to make ambient light intensity (brightness) measurements. Ambient light intensity measurements, which may sometimes be referred to as ambient light luminance measurements, may be used by device 10 to adjust display brightness (as an example).

Ambient light sensors 20 may also be used to make measurements of ambient light color (e.g., color coordinates, correlated color temperature, or other color parameters representing ambient light color). Processing circuitry 16 may be used to convert these different types of color information to other formats, if desired (e.g., a set of red, green, and blue sensor output values may be converted into color chromaticity coordinates and/or may be processed to produce an associated correlated color temperature, etc.).

Color information and brightness information from color sensing ambient light sensor 20 can be used to adjust the operation of device 10. For example, the color cast of display 14 may be adjusted in accordance with the color of ambient lighting conditions. If, for example, a user moves device 10 from a cool lighting environment to a warm lighting environment (e.g., an incandescent light environment), the warmth of display 14 may be increased accordingly, so that the user of device 10 does not perceive display 14 as being overly cold. If desired, the ambient light sensor may include an infrared light sensor. In general, any suitable actions may be taken based on color measurements and/or total light intensity measurements (e.g., adjusting display brightness, adjusting display color temperature, adjusting display white point, adjusting display color cast, adjusting display content, changing audio and/or video settings, adjusting sensor measurements from other sensors, adjusting which on-screen options are presented to a user of device 10, adjusting wireless circuitry settings, etc.).

Figure 2:
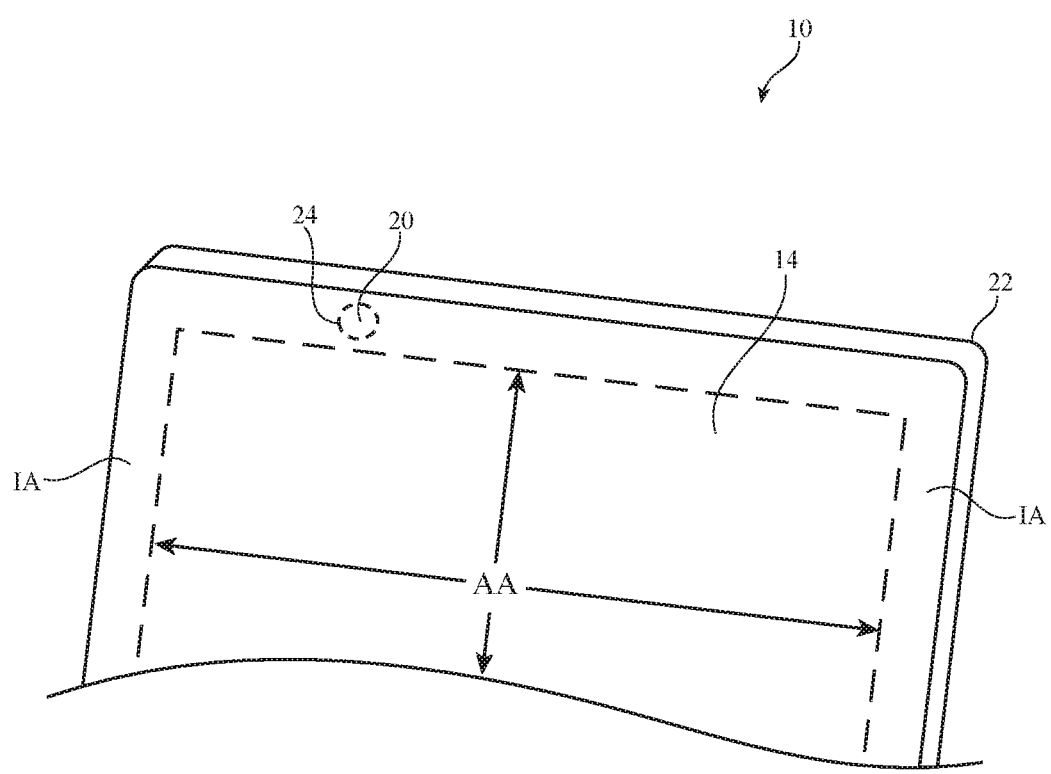
FIG. 2 is a front perspective view of a portion of an illustrative electronic device in accordance with an embodiment.

A perspective view of a portion of an illustrative electronic device is shown in FIG. 2. In the example of FIG. 2, device 10 includes a display such as display 14 mounted in housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button, a speaker port, or other components. Openings may be formed in housing 22 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images. To hide inactive circuitry and other components in border area IA from view by a user of device 10, the underside of the outermost layer of display 14 (e.g., the display cover layer or other display layer) may be coated with an opaque masking material such as a layer of black ink. Optical components (e.g., a camera, a light-based proximity sensor, an ambient light sensor, status indicator light-emitting diodes, camera flash light-emitting diodes, etc.) may be mounted under inactive border area IA. One or more openings (sometimes referred to as windows) may be formed in the opaque masking layer of IA to accommodate the optical components. For example, a light component window such as an ambient light sensor window may be formed in a peripheral portion of display 14 such as region 24 in inactive border area IA. Ambient light from the exterior of device 10 may be measured by ambient light sensor 20 in device 10 after passing through region 24 of the display cover layer.

Figure 3:
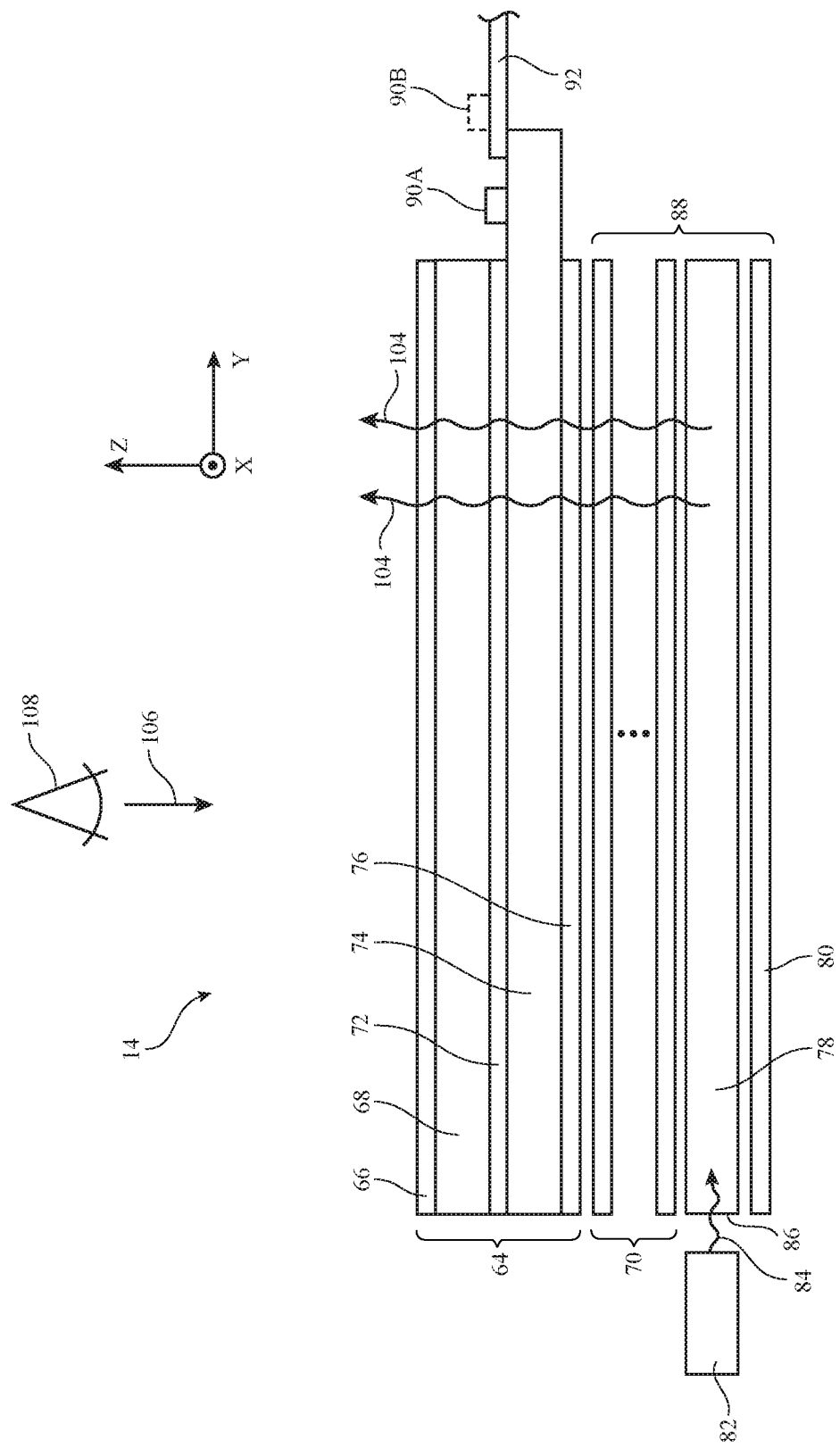
FIG. 3 is a cross-sectional side view of an illustrative display having a backlight in accordance with an embodiment.

A cross-sectional side view of an illustrative configuration for display 14 of device 10 is shown in FIG. 3. As shown in FIG. 3, display 14 may include backlight structures such as backlight unit 88 for producing backlight 104. During operation, backlight 104 travels outwards (vertically upwards in dimension Z in the orientation of FIG. 3) and passes through display pixel structures in display layers 64. This illuminates any images that are being produced by the display pixels for viewing by a user. For example, backlight 104 may illuminate images on display layers 64 that are being viewed by viewer 108 in direction 106.

Display layers 64 may be mounted in chassis structures such as a plastic chassis structure and/or a metal chassis structure to form a display module for mounting in housing 12 or display layers 64 may be mounted directly in housing 12 (e.g., by stacking display layers 64 into a recessed portion in housing 12). Display layers 64 may form a liquid crystal display or may be used in forming displays of other types.

Display layers 64 may include a liquid crystal layer such a liquid crystal layer 72. Liquid crystal layer 72 may be sandwiched between display layers such as display layers 68 and 74. Layers 68 and 74 may be interposed between lower polarizer layer 76 and upper polarizer layer 66.

Layers 68 and 74 may be formed from transparent substrate layers such as clear layers of glass or plastic. Layers 68 and 74 may be layers such as a thin-film transistor layer and/or a color filter layer. Conductive traces, color filter elements, transistors, and other circuits and structures may be formed on the substrates of layers 68 and 74 (e.g., to form a thin-film transistor layer and/or a color filter layer). Touch sensor electrodes may also be incorporated into layers such as layers 68 and 74 and/or touch sensor electrodes may be formed on other substrates.

With one illustrative configuration, layer 74 may be a thin-film transistor layer that includes an array of pixel circuits based on thin-film transistors and associated electrodes (pixel electrodes) for applying electric fields to liquid crystal layer 72 and thereby displaying images on display 14. Layer 68 may be a color filter layer that includes an array of color filter elements for providing display 14 with the ability to display color images. In another suitable configuration, layer 74 may be a color filter layer and layer 68 may be a thin-film transistor layer. Configurations in which color filter elements are combined with thin-film transistor structures on a common substrate layer in the upper or lower portion of display 14 may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 90A or 90B using a signal path such as a signal path formed from conductive metal traces in a rigid or flexible printed circuit such as printed circuit 92 (as an example).

Backlight structures 88 may include a light guide layer such as light guide layer 78 (sometimes referred to as a light guide structure or light guide). Light guide layer 78 may be formed from a transparent material such as clear glass or plastic. During operation of backlight structures 88, a light source such as light source 82 may generate light 84. Light source 82 may be, for example, an array of light-emitting diodes.

Light 84 from light source 82 may be coupled into edge surface 86 of light guide layer 78 and may be distributed in dimensions X and Y throughout light guide layer 78 due to the principal of total internal reflection. Light guide layer 78 may include light-scattering features such as pits or bumps. The light-scattering features may be located on an upper surface and/or on an opposing lower surface of light guide layer 78. Light source 82 may be located at the left edge of light guide layer 78 as shown in FIG. 2 or may be located along the right edge of layer 78 and/or other edges of layer 78. Light may be emitted into one edge of light guide layer 78 or may be emitted into two or more edges of light guide layer 78.

Light 84 that scatters upwards in direction Z from light guide layer 78 may serve as backlight 104 for display 14. Light 84 that scatters downwards may be reflected back in the upwards direction by reflector 80. Reflector 80 may be formed from a reflective material such as a layer of plastic covered with a dielectric mirror thin-film coating.

To enhance backlight performance for backlight structures 88, backlight structures 88 may include optical films 70. Optical films 70 may include diffuser layers for helping to homogenize backlight 104 and thereby reduce hotspots, compensation films for enhancing off-axis viewing, and brightness enhancement films (also sometimes referred to as turning films) for collimating backlight 104. Optical films 70 may overlap the other structures in backlight unit 88 such as light guide layer 78 and reflector 80. For example, if light guide layer 78 has a rectangular footprint in the X-Y plane of FIG. 3, optical films 70 and reflector 80 may have a matching rectangular footprint. If desired, films such as compensation films may be incorporated into other layers of display 14 (e.g., polarizer layers).

Figure 4:
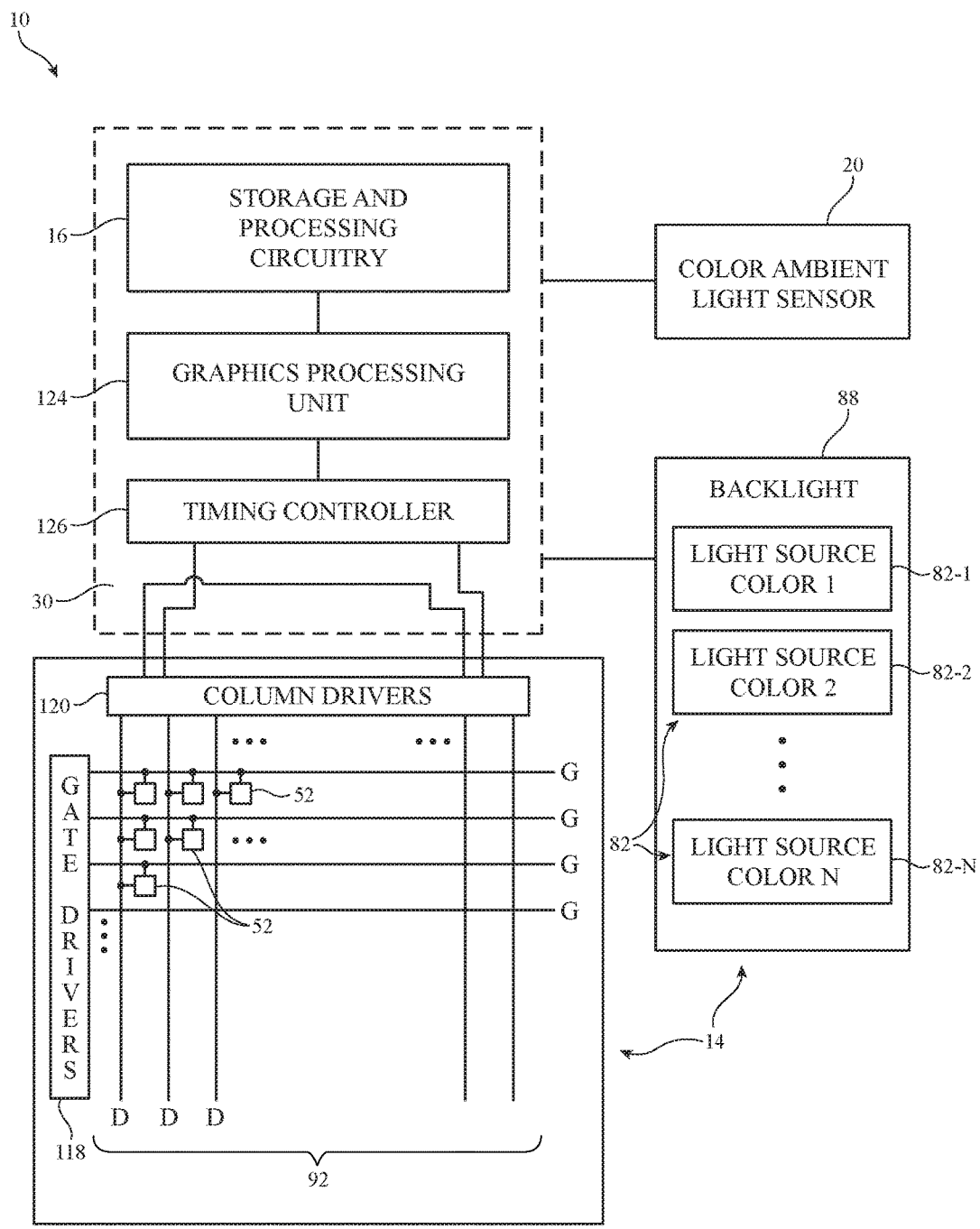
FIG. 4 is a schematic diagram of an illustrative electronic device having a display, control circuitry, and a color ambient light sensor in accordance with an embodiment.

FIG. 4 is a diagram of device 10 showing illustrative circuitry that may be used in displaying images for a user of device 10 on pixel array 92 of display 14. As shown in FIG. 4, display 14 may have column driver circuitry 120 that drives data signals (analog voltages) onto the data lines D of array 92. Gate driver circuitry 118 drives gate line signals onto gate lines G of array 92. Using the data lines and gate lines, display pixels 52 may be configured to display images on display 14 for a user. Gate driver circuitry 118 may be implemented using thin-film transistor circuitry on a display substrate such as a glass or plastic display substrate or may be implemented using integrated circuits that are mounted on the display substrate or attached to the display substrate by a flexible printed circuit or other connecting layer. Column driver circuitry 120 may be implemented using one or more column driver integrated circuits that are mounted on the display substrate or using column driver circuits mounted on other substrates.

During operation of device 10, storage and processing circuitry 16 may produce data that is to be displayed on display 14. This display data may be provided to control circuitry such as timing controller integrated circuit 126 using graphics processing unit 124.

Timing controller 126 may provide digital display data to column driver circuitry 120 using paths 128. Column driver circuitry 120 may receive the digital display data from timing controller 126. Using digital-to-analog converter circuitry within column driver circuitry 120, column driver circuitry 120 may provide corresponding analog output signals on the data lines D running along the columns of display pixels 52 of array 92.

Display 14 may include backlight structures 88 for illuminating display 14. Backlight structures 88 may include one or more light sources 82. If desired, backlight structures 88 may include N light sources 82 of N different colors. For example, backlight structures 88 may include light source 82-1 of a first color, light source 82-2 of a second color, light source 82-N of an Nth color, etc. Each light source 82 may include one or more light-emitting diodes. Light sources 82 may include blue light-emitting diodes, red light-emitting diodes, green light emitting diodes, ultraviolet light-emitting diodes, white light-emitting diodes, or light-emitting diodes of other colors. White light-emitting diodes in backlight 88 may be formed from blue light-emitting diodes coated with a yellow phosphor, blue light light-emitting diodes coated with red and green phosphors, blue light-emitting diodes coated with quantum dots, white organic light-emitting diodes, a combination of red, green, and blue light-emitting diodes, or other suitable light-emitting diode structures.

White light-emitting diodes in backlight 88 may produce the same hue of white or may produce different hues of white. For example, light source 82-1 may produce warm white light having a first color temperature and light source 82-2 may produce cool white light having a second color temperature that is higher than the first color temperature. By controlling the intensity ratio of light sources 82 of different colors, backlight 88 may be operated to produce different colors light (e.g., warm white light in warm ambient lighting conditions and cool white light in cool ambient lighting conditions).

Storage and processing circuitry 16, graphics processing unit 124, and timing controller 126 may sometimes collectively be referred to herein as control circuitry 30. Control circuitry 30 may be used in controlling the operation of display 14.

Pixels 52 may include color pixels such as red (R) pixels, green (G) pixels, blue pixels (B) pixel, white (W) pixels, and/or pixels of other colors. Arrangements in which pixels 52 include a pattern of red, green, and blue pixels are sometimes described herein as an illustrative example. Color pixels may include color filter elements that transmit light of a particular color while blocking other colors. For example, white light from backlight 88 may be filtered by a red color filter in one of pixels 52 to produce red light.

Control circuitry 30 and associated thin-film transistor circuitry associated with display 14 may be used to produce signals such as data signals and gate line signals for operating pixels 52 (e.g., turning pixels 52 on and off, adjusting the intensity of pixels 52, etc.). During operation, control circuitry 30 may control the values of the data signals and gate signals to control the light intensity associated with each of the display pixels and to thereby display images on display 14.

Control circuitry 30 may produce red, green, and blue pixel values (sometimes referred to as RGB values or digital display control values) corresponding to the color to be displayed by a given pixel. The RGB values may be converted into analog display signals for controlling the brightness of each pixel. The RGB values (e.g., integers with values ranging from 0 to 255) may correspond to the desired pixel intensity of each pixel. For example, a digital display control value of 0 may result in an "off" pixel, whereas a digital display control value of 255 may result in a pixel operating at a maximum power and brightness.

If desired, each color channel may have eight bits, six bits, or any other suitable number of bits. In arrangements where each color channel has eight bits, the digital display control values that control each pixel may be integers ranging from 0 to 255. In arrangements where each color channel has six bits, the digital display control values that control each pixel may be integers ranging from 0 to 64. Arrangements in which each color channel has eight bits are sometimes described herein as an illustrative example.

Control circuitry 30 may gather ambient light sensor data from color ambient light sensor 20 to adaptively determine how to adjust display light and display colors based on ambient lighting conditions. If desired, control circuitry 30 may control display 14 using other information such as time information from a clock, calendar, and/or other time source, location information from location detection circuitry (e.g., Global Positioning System receiver circuitry, IEEE 802.11 transceiver circuitry, or other location detection circuitry), user input information from a user input device such as a touchscreen (e.g., touchscreen display 14) or keyboard, etc.

Ambient light sensor 20 may be used to measure the color and intensity of ambient light. Control circuitry 30 may adjust the operation of display 14 based on the color and intensity of ambient light. In adjusting the output from display 14, control circuitry 30 may take into account the chromatic adaptation function of the human visual system. This may include, for example, adjusting the white point of display 14 based on the color and/or brightness of ambient light measured by ambient light sensor 20. If, for example, a user moves device 10 from a cool lighting environment (e.g., outdoor light having a relatively high correlated color temperature) to a warm lighting environment (e.g., indoor light having a relatively low correlated color temperature), the "warmth" of display 14 may be increased accordingly by adjusting the white point of display 14 to a warmer white (e.g., a white with a cooler color temperature), so that the user of device 10 does not perceive display 14 as being overly cold.

To produce light with the new ambient-adapted white point, control circuitry 30 may adjust the input pixel values that are provided to pixels 52 and/or may adjust the color of backlight 104 that is emitted from backlight unit 88. Adjusting the color of light from backlight 88 may help reduce the amount of pixel value truncation needed to achieve the desired color cast.

Figure 5:
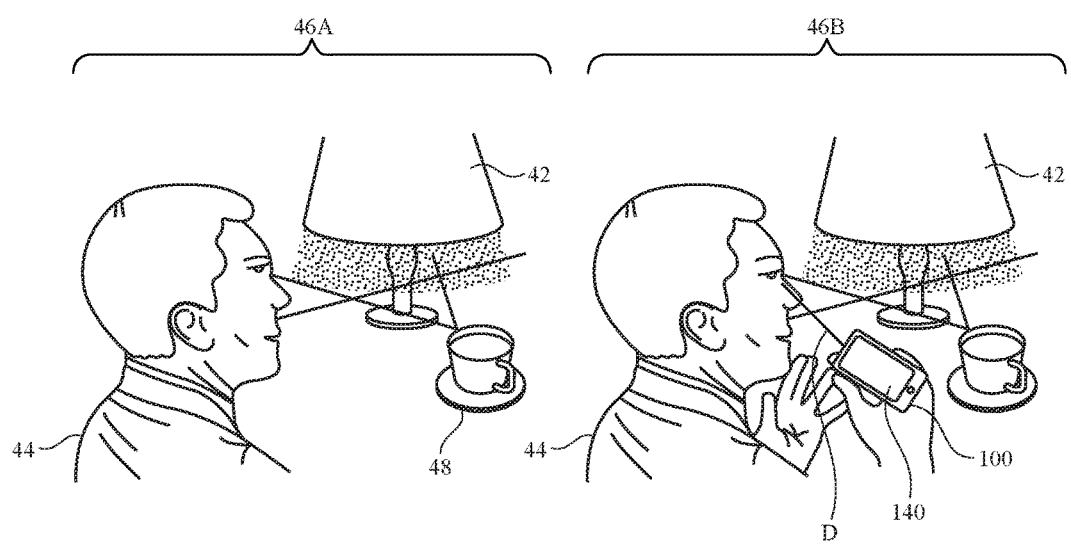
FIG. 5 is a diagram illustrating how conventional displays do not adapt to the color of ambient light and become unsightly to a user as a result.

FIG. 5 is a diagram illustrating the effects of using a conventional display that does not adapt to the color of ambient light. Conventional displays such as display 140 of device 100 typically have a fixed target white point such as D65 (a standard illuminant defined by the International Commission on Illumination). In scenario 46A, user 44 observes external objects 48 under illuminant 42 (e.g., an indoor light source that generates warm light). The vision of user 44 adapts to the color and brightness of the ambient lighting conditions. Scenario 46B represents how a user perceives light from display 140 of device 100 after having adapted to the color and brightness of illuminant 42. Because the white point of display 140 remains fixed at D65, device 100 does not account for the chromatic adaptation of human vision, and display 140 appears bluish and unsightly to user 44 as a result.

To avoid the perceived discoloration of display 14, control circuitry 30 of FIG. 4 may adjust the white point and color cast of display 14 based on the color (and intensity, if desired) of ambient light. This may include, for example, adaptively adjusting the white point of display 14 to have a color that more closely matches the color of ambient light.

Figure 6:
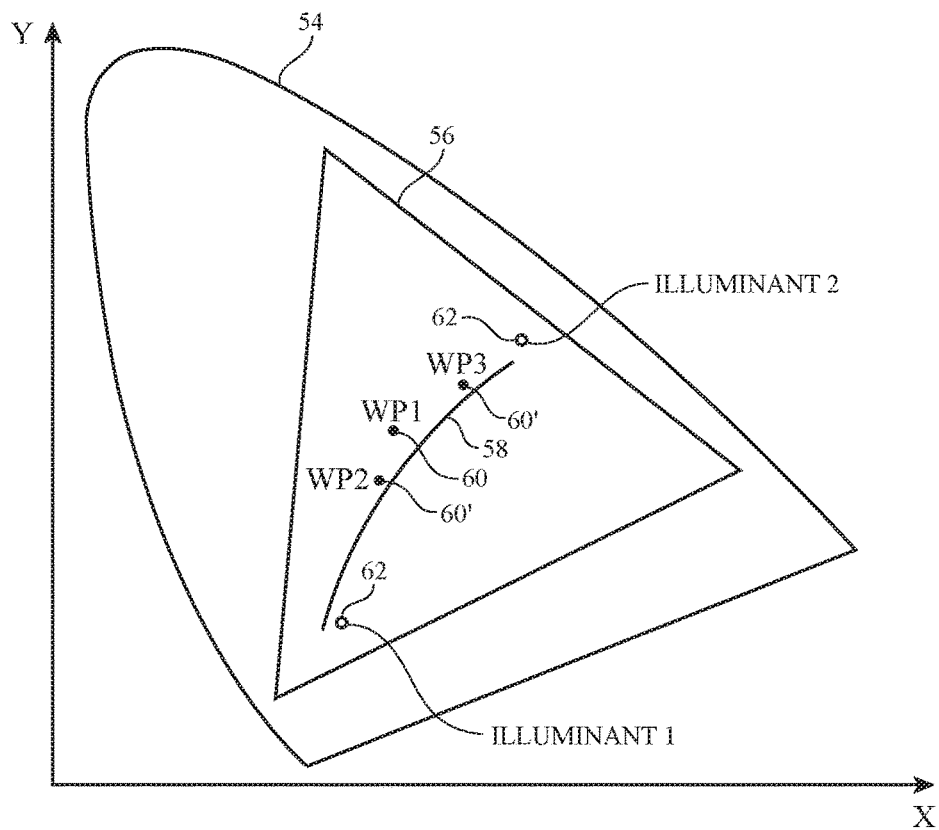
FIG. 6 is a chromaticity diagram illustrating how the white point of a display may be adjusted based on the color of ambient light in accordance with an embodiment.

A chromaticity diagram illustrating how display 14 may have an adaptive white point that is determined at least partly based on ambient lighting conditions is shown in FIG. 6. The chromaticity diagram of FIG. 6 illustrates a two-dimensional projection of a three-dimensional color space (sometimes referred to as the 1931 CIE chromaticity diagram). The color generated by a display such as display 14 may be represented by chromaticity values x and y. The chromaticity values may be computed by transforming, for example, three color intensities (e.g., intensities of colored light emitted by a display) such as intensities of red, green, and blue light into three tristimulus values X, Y, and Z and normalizing the first two tristimulus values X and Y (e.g., by computing $x=X/(X+Y+Z)$ and $y=Y/(X+Y+Z)$ to obtain normalized x and y values). Transforming color intensities into tristimulus values may be performed using transformations defined by the International Commission on Illumination (CIE) or using any other suitable color transformation for computing tristimulus values.

Any color generated by a display may therefore be represented by a point (e.g., by chromaticity values x and y) on a chromaticity diagram such as the diagram shown in FIG. 6. Bounded region 54 of FIG. 6 represents the limits of visible light that may be perceived by humans (i.e., the total available color space). The colors that may be generated by a display are contained within a subregion of bounded region 54. For example, bounded region 56 may represent the available color space for display 14 (sometimes referred to as the color gamut of display 14).

Display 14 may be characterized by various calibration settings such as gamma and white point. The "white point" of a display may refer to the color produced by the display when the input pixel values are all equal to a maximum digital input value (e.g., when $R=G=B=255$). The white point of a display defines the color cast of the display and is sometimes referred to as the "color temperature" of the display. White points with lower color temperatures produce warmer color casts, whereas white points with higher color temperatures produce cooler color casts.

The white point of display 14 may be defined by an illuminant (e.g., D65, D50, or other illuminant), a color temperature (e.g., 6,500 degrees Kelvin (K), 5,000 K, or other color temperature), or a set of chromaticity coordinates. The color temperature of a light source refers to the temperature at which a theoretical black body radiator would emit radiation of a color most closely resembling that of the light source. Curve 58 illustrates the range of colors that would radiate from an ideal black body at different color temperatures and is sometimes referred to as the Planckian locus or black body curve. The color temperatures on black body curve 58 range from higher temperatures on the left (e.g., near the cooler hues around Illuminant 1) to lower temperatures on the right (e.g., near the warmer hues around Illuminant 2).

Control circuitry 30 of FIG. 4 may operate display 14 in an ambient-adaptive mode and a non-adaptive mode. In ambient-adaptive mode, control circuitry 30 may adaptively adjust the white point of display 14 based on the color of ambient light. In non-adaptive mode, the white point of display 14 may remain fixed at a default white point such as WP1 (represented by point 60 of FIG. 6). Control circuitry 30 may switch between ambient-adaptive mode and non-adaptive mode automatically and/or a user may manually adjust the settings of display 14 to switch between ambient-adaptive mode and non-adaptive mode.

The default white point WP1 of display 14 may be any suitable white point. For example, white point WP1 may be D65, D50, or any other suitable white color. If desired, white point WP1 may be selected and/or adjusted by the user. When operating in non-adaptive mode, the white point of display 14 may remain fixed at WP1 even as the ambient lighting conditions change.

In ambient-adaptive mode, however, control circuitry 30 may automatically adjust the white point of display 14 based on the color of ambient light. There may be certain ambient lighting situations where the default white point WP1 is appropriate. For example, when ambient light is neither overly cool nor overly warm, default white point WP1 may be a close match to the ambient light and may therefore be agreeable to the user's eyes. However, under other ambient lighting conditions (e.g., under different illuminants such as illuminants 62 of FIG. 6), control circuitry 30 may adjust the white point of display 14 to an ambient-adaptive white point (e.g., one of ambient-adaptive white points 60' of FIG. 6).

For example, under a first ambient illuminant 62 such as Illuminant 1, control circuitry 30 may adjust the white point of display 14 to ambient-adapted white point WP2 (represented by one of points 60'). Ambient-adapted white point WP2 more closely matches the color of Illuminant 1 than default white point WP1. Under a second ambient illuminant 62 such as Illuminant 2, control circuitry 30 may adjust the white point of display 14 to ambient-adapted white point WP3 (represented by another one of points 60'). Ambient-adapted white point WP3 more closely matches the color of Illuminant 2 than default white point WP1.

By adjusting the white point of display 14 based on the color of ambient light, the color cast of display 14 will adapt to the different ambient lighting conditions just as the user's vision chromatically adapts to different ambient lighting conditions. For example, Illuminant 2 may correspond to an indoor light source having a warm hue, whereas Illuminant 1 may correspond to daylight having a cool hue. Illuminant 2 may have a lower color temperature than Illuminant 1 and may therefore emit warmer light. In warmer ambient light (e.g., under Illuminant 2), control circuitry 30 can adjust the white point of display 14 to ambient-adapted white point WP3, which in turn adjusts the color cast of display 14 to produce warmer light (i.e., light with a lower color temperature) than that which would be produced if the default white point WP1 were maintained as the display white point.

In addition to helping avoid perceived color shifts in different ambient lighting conditions, this type of adaptive color adjustment may also have beneficial effects on the human circadian rhythm. The human circadian system may respond differently to different wavelengths of light. For example, when a user is exposed to blue light having a peak wavelength within a particular range, the user's circadian system may be activated and melatonin production may be suppressed. On the other hand, when a user is exposed to light outside of this range of wavelengths or when blue light is suppressed (e.g., compared to red light), the user's melatonin production may be increased, signaling nighttime to the body.

Conventional displays do not take into account the spectral sensitivity of the human circadian rhythm. For example, some displays emit light having spectral characteristics that trigger the circadian system regardless of the time of day, which can in turn have an adverse effect on sleep quality.

In contrast, by using the color cast adjustment method described in connection with FIG. 6, the ambient-adapted white point of display 14 may become warmer in warmer ambient lighting conditions (e.g., may be adjusted to white point WP3 or other suitable warm white). Thus, when a user is at home in the evening (e.g., reading in warm ambient light), blue light emitted from display 14 may be suppressed (e.g., relative to other colors) as the display adapts to the warm ambient lighting conditions. The reduction in blue light may in turn reduce suppression of the user's melatonin production (and, in some scenarios, may increase the user's melatonin production) to promote better sleep.

As described in connection with FIG. 4, the color cast and white point of display 14 may be adjusted by adjusting the pixel values the are provided to pixels 52 and/or by adjusting the color of light emitted from backlight 88. By adjusting the color of light emitted from backlight 88, less pixel value adjustment may be required to achieve a desired white point, which in turn can help avoid undesirable image artifacts and brightness loss that can occur when pixel values are truncated by large amounts. This is, however, merely illustrative. If desired, white point may be adjusted by only adjusting pixel values, by only adjusting backlight color, or by adjusting both pixel values and backlight color.

Figure 7:
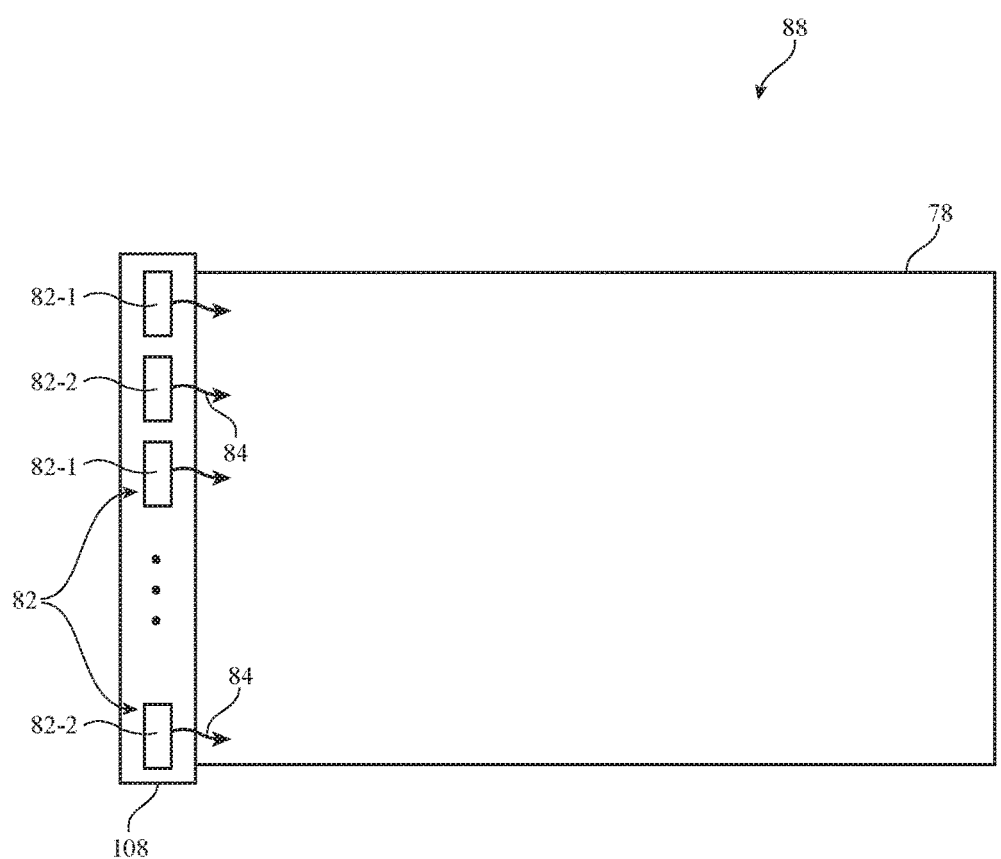
FIG. 7 is a top view of an illustrative backlight for a display having light sources of different colors in accordance with an embodiment.

FIG. 7 is a top view of illustrative backlight structures 88 that may be used to illuminate display 14 with different colors of light. Backlight for display 14 may be generated by an array of light-emitting diodes 82. Light-emitting diodes 82 may run along an upper edge of light guide layer 78. If desired, more than one array of light-emitting diodes may be used to generate backlight. For example, in larger displays, it may be desirable to inject light from opposing edges of light guide layer 78. With this type of configuration, light 84 may be generated using opposing upper and lower rows of light-emitting diodes or light-emitting diode arrays that run along the opposing left and right edges of light guide layer 78 (as examples). Backlight configurations for display 14 in which there are more than two arrays of light-emitting diodes may also be used. The configuration of FIG. 7 in which light 84 is provided by a single row of light-emitting diodes that runs along one edge of light guide layer 78 is merely illustrative.

Backlight structures 88 may include light sources 82 that emit light 84 of different colors. In the example of FIG. 7, backlight structures 88 include light sources 82-1 of a first color and light sources 82-2 of a second color. This is, however, merely illustrative. If desired, there may be three, four, five, or more than five colors of light sources 82. Examples in which backlight structures 88 include light sources 88 of first and second colors are sometimes described herein as an example. Light-emitting diodes 82 may be mounted to a printed circuit such as printed circuit 108 (e.g., a flexible printed circuit or a rigid printed circuit).

In one illustrative arrangement, light source 82-1 may produce warm light and light source 82-2 may produce cool light. Light source 82-1 may, for example, be a light source that produces warm white light or yellow light (e.g., warm light having a color temperature between 2,500 K and 3,500 K, between 3,000 K and 4,000 K, between 4,000 K and 5,000 K, between 5,000 K and 6,500 K, or other suitable color temperature). Light source 82-2 may be a light source that produces cool white light or blue light (e.g., cool light having a color temperature between 11,500 K and 10,500 K, between 11,000 K and 9,000 K, between 9,000 K and 7,500 K, between 7,500 K and 6,500 K, or other suitable color temperature).

By combining warm (yellowish) light sources 82-1 with cool (bluish) light sources 82-2, the color of light emitted by backlight structures 88 may be tuned by controlling the intensity of light sources 82-1 relative to the intensity of light sources 82-2. Control circuitry 30 may, for example, tune the color of light emitted by backlight 88 according to the color of ambient light. In warmer ambient lighting conditions (e.g., warm indoor light), control circuitry 30 may increase the intensity of light emitted from warm light source 82-1 relative to the intensity of light emitted from cool light source 82-2. In cooler ambient lighting conditions (e.g., in cool daylight), control circuitry 30 may increase the intensity of light emitted from cool light source 82-2 relative to the intensity of light emitted from warm light source 82-1. As shown in FIG. 7, light sources of different colors such as light sources 82-1 and 82-2 may be alternated with each other along the edge of light guide layer so that the different colors mix together before exiting light guide layer 78.

If desired, light-scattering features on light guide layer 78 may be tailored to the specific colors of light sources 82. For example, the shape, size, and/or location of the light-scattering features on light guide layer 78 may be optimized to produce uniform light both in situations where only one color light source 82 is used as well as situations where light sources 82 of different colors are used.

Figure 8:
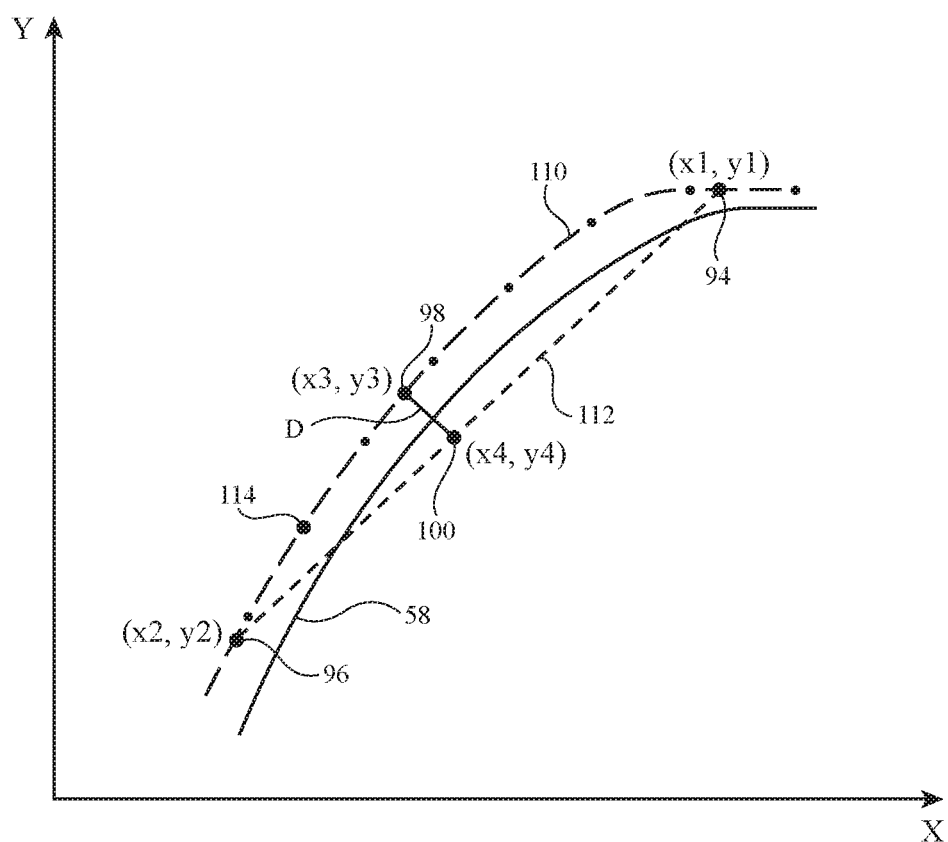
FIG. 8 is a chromaticity diagram illustrating how a range of colors may be produced by a backlight that includes light sources of two or more colors in accordance with an embodiment.

FIG. 8 is a chromaticity diagram illustrating how light sources of different colors may be used to produce backlight having a color that adapts to ambient lighting conditions. Curve 58 illustrates the range of colors that would radiate from an ideal black body at different color temperatures. Curve 110 represents a range of ambient light colors (e.g., colors associated with common light sources). As shown in FIG. 8, most illuminants on curve 110 are close to black body curve 58.

FIG. 8 illustrates an example in which light source 82-1 produces colored light having chromaticity coordinates (x1, y1) at point 94 and light source 82-2 produces colored light having chromaticity coordinates (x2, y2) at point 96. Line 112 between point 94 and point 96 may therefore represent the range of colors that can be produced by light source 82-1 and 82-2. In arrangements where backlight 88 includes three or more colors of light sources 82, the available colors that may be produced by backlight 88 may be expanded to a larger range of colors (e.g., in addition to the colors along line 112, the colors that backlight 88 is capable of producing may be expanded to a two-dimensional plane or three-dimensional volume of the color space of FIG. 8).

It may be desirable to operate light sources 82-1 and 82-2 to produce a color of light that is as close as possible to the desired white point. This may in turn reduce the amount of pixel value truncation needed to achieve the desired white point. For example, consider a scenario where the ambient-adapted white point is located at point 98 having chromaticity coordinates (x3, y3). Ambient-adapted white point 98 may, for example, be determined based on the color of ambient light (e.g., white point 98 may be equal or close to the color of ambient light as measured by ambient light sensor 20). If the backlight was only capable of producing a single hue of white such as D65 at point 114, control circuitry 30 would have to significantly truncate blue pixel values to achieve ambient-adapted white point 98 having chromaticity coordinates (x3, y3).

With light sources of multiple colors, on the other hand, control circuitry 30 may adjust the intensity of light sources 82-1 and 82-2 so that the color of the combined light from light sources 82-1 and 82-2 is as close as possible to the ambient-adapted white point. In the example of FIG. 8, light from sources 82-1 and 82-2 is mixed to produce colored light having chromaticity coordinates (x4, y4) at point 100. Equation (1) below illustrates one suitable method for determining the chromaticity coordinates (x4, y4) of backlight color 100 based on the chromaticity coordinates (x1, y1) of color 94 produced by first light source 82-1, the chromaticity coordinates (x2, y2) of color 96 produced by second light source 82-2, and the chromaticity coordinates (x3, y3) of ambient-adapted white point 98.

$$x_4 = x_3 - \frac{(y_2 - y_1)(x_3 - x_1) - (x_2 - x_1)(y_3 - y_1)}{(y_2 - y_1)^2 + (x_2 - x_1)^2} \cdot (y_2 - y_1)$$

$$y_4 = y_3 + \frac{(y_2 - y_1)(x_3 - x_1) - (x_2 - x_1)(y_3 - y_1)}{(y_2 - y_1)^2 + (x_2 - x_1)^2} \cdot (x_2 - x_1)$$

(1)

In some situations, light sources 82 may be capable of producing a color of light that matches the desired ambient-adapted white point. In this type of scenario, pixel value truncation may not be required at all. For example, if the measured ambient light results in a desired white point located on line 112 between color 94 of light source 82-1 and color 96 of light source 82-2, then pixel values need not be truncated. In other situations, a certain amount of pixel value truncation may be needed to produce the desired ambient-adapted white point on display 14. In the example of FIG. 8, color 100 produced by backlight 88 may be located a distance D from the desired-ambient white point 98. Control circuitry 30 may adjust input pixel values to adjust the white point from point 100 to point 98. Even though some pixel value truncation is used to achieve white point 98, the amount of pixel value adjustment needed to adjust the white point from point 100 to point 98 may be less than that needed to adjust the white point from color 114 (e.g., if the color of backlight was fixed at point 114) to color 98. The ability to tune the color of backlight 104 (FIG. 3) may allow control circuitry 30 to adaptively adjust the white point of display 14 based on ambient light color without the brightness loss and motion blur artifacts that can sometimes occur when pixel values are truncated excessively.

FIG. 9 is table illustrating how less pixel value truncation is needed to achieve a desired white point when using a backlight with light sources of two or more colors relative to using a backlight with light sources of only one color. The first column of the table indicates whether the backlight sources are all the same color (e.g., color 114 of FIG. 8 such as D65) or whether the backlight sources have two colors (e.g., colors 94 and 96 of FIG. 8 such as D35 and D90, respectively). The second column of the table indicates the input RGB pixel values. In this example, the input RGB pixel values correspond to the color white (e.g., R=G=B=255). The third column of the table indicates the output RGB pixel values for displaying white in warm ambient light (e.g., when the desired ambient-adapted white point has a color temperature of 3,500 K to match ambient light having a color temperature of 3,500 K). The fourth column of the table indicates the output RGB pixel values for displaying white in cool ambient light (e.g., when the desired ambient-adapted white point has a color temperature of 9,000 K to match ambient light having a color temperature of 9,000 K).

Backlights that only have light sources of one color rely entirely on pixel value truncation to achieve a white point that is different from the color of light produced by the backlight. If, for example, the backlight is only capable of producing D65 white, the input pixel values (255, 255, 255) need to be adjusted to (255, 210, 155) in order to produce warm D35 white. The green and blue output pixel values are reduced significantly relative to the red channel to shift the D65 white produced by the backlight to the desired D35 white. Similarly, in order to produce cool D90 white, input pixel values (255, 255, 255) need to be adjusted to (220, 230, 255). The red and green pixel values are reduced significantly relative to the blue channel to shift the D65 white produced by the backlight to the desired D90 white.

The truncation of the blue channel to achieve warm D35 white and the truncation of the red channel to achieve cool D90 white reduces the brightness of the display since one channel needs to block more light in order to achieve the desired color. Also, since the response time of a pixel varies as a function of the magnitude of the liquid crystal switching voltage applied to the pixel, larger differences in pixel values between the red, green, and blue channels results in unequal response times among the red, green, and blue pixels, which can lead to motion blur artifacts.

As an example, consider the response of a pixel when switching from black (0,0,0) to warm D35 white with values (255, 210, 155). In this situation, a large voltage drop appears across the red subpixel (i.e., a voltage drop associated with a difference of 255 in before and after digital values) and lower voltage drops appear across the green subpixel (a voltage associated with pixel value change of 210) and blue subpixel (a pixel value change of 155). Because the voltage on the red subpixel (and therefore the electric field applied by the red electrode to the liquid crystal layer) is relatively large, the liquid crystal molecules of the red subpixel will rotate more quickly than the liquid crystal molecules of the green and blue subpixels. The red subpixel will therefore change color (from black to red) faster than the green and blue subpixels will switch from black to green and black to blue, respectively. The disparate switching speeds of the subpixels of different colors can lead to unpleasant visual artifacts. If a black item is being moved across a warm white background, for example, the relatively faster switching speed of the red subpixels has the potential to create undesirable red motion blur effects.

The use of different color light sources in backlight 88 may help avoid brightness loss and motion blur effects associated with excessive pixel value truncation. The ability to produce different colors of backlight reduces the amount of pixel truncation needed to achieve a desired white point. If, for example, the backlight includes a first light source producing D35 white and a second light source producing D90 white, the colors that may be produced by the backlight include D90, D35, and the range of colors produced by mixing D90 and D35 at different intensity levels.

Thus, in the example of FIG. 9, backlight 88 may produce a warm D35 white by turning on the D35 light source and turning off the D90 light source. Because the backlight is already at the desired D35 white point, no pixel truncation is needed and the output pixel values may remain at (255, 255, 255) to achieve the desired D35 white point. Similarly, backlight 88 may produce a cool D90 white by turning on the D90 light source and turning off the D35 light source. Output pixel values may therefore remain at (255, 255, 255) to achieve the desired D90 white point. In some scenarios, the ambient-adapted white point may be produced by backlight 88 by mixing an appropriate intensity ratio of light from the first light source with light from the second light source.

In scenarios where backlight 88 is not capable of producing the desired ambient-adaptive white point, control circuitry 30 may adjust the intensity of the different color light sources to produce a white that is close to the desired white point (e.g., using equation (1) above to determine the backlight color that is closest to the desired white point color). Control circuitry 30 may then adjust the input pixel values as needed to shift the white of the backlight to the desired ambient-adapted white point (e.g., to shift the color 100 produced by the backlight to the desired white point 98).

In some arrangements, warm light source 82-1 may be formed from an ultraviolet light-emitting diode covered with one or more phosphors that absorb some of the ultraviolet light and re-emit the light as red and green light. Cool light source 82-2 may be formed from a blue light-emitting diode covered with one or more phosphors that absorb some of the blue light and re-emit the light as red and green light. FIGS. 10-13 illustrate different configurations for light sources 82 that include ultraviolet light-emitting diodes and blue light-emitting diodes.

Figure 10:
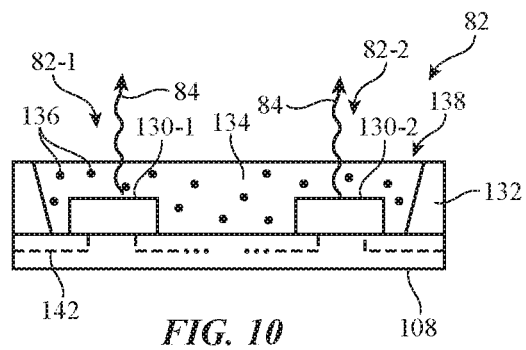
FIG. 10 is a top view of an illustrative light source semiconductor package that includes blue and ultraviolet light-emitting diode dies and a shared phosphor layer in accordance with an embodiment.

As shown in FIG. 10, light source 82 may have a package body such as package body 132. Package body 132, which may sometimes be referred to as a package, may be formed from a molded thermoplastic, ceramic, or resin (as examples). In the example of FIG. 10, package body 132 includes light source 82-1 formed from light-emitting diode die 130-1 and light source 82-2 formed from light-emitting diode die 130-2. Light-emitting diode die 130-1 and light-emitting diode die 130-2 (e.g., semiconductor devices) may be mounted to printed circuit substrate 108 and may be used in producing light 84 that propagates through package window 138.

Window 138 may be formed from material 134 such as epoxy or other polymer that includes phosphorescent filler material 136 (e.g., phosphor). Phosphorescent material 136 may help convert output light from devices 130-1 and 130-2 into light of another color. Windows such as window structures 138 may encapsulate the die and phosphor, thereby allowing light generated from those two components to propagate outside of package 132 into air. Material 134 containing phosphor 136 may be dispensed into package 132 or may be formed using other suitable methods.

In one illustrative arrangement, light-emitting diode die 130-1 may be an ultraviolet light-emitting diode die (e.g., emitting light having a peak wavelength between 400 nm and 420 nm, between 380 nm and 400 nm, between 360 nm and 400 nm, between 380 nm and 430 nm, between 300 nm and 380 nm, or other suitable peak wavelength). Light-emitting diode die 130-2 may be a blue light-emitting diode die (e.g., emitting light having a peak wavelength between 450 nm and 495 nm, between 430 nm and 480 nm, or other suitable peak wavelength).

Phosphorescent material 136 may absorb some of the light emitted from light-emitting diode dies 130-1 and 130-2 and may re-emit the light as broadband yellow light (having green and red components) or as narrow band green and red light. Phosphorescent material 136 may include a yttrium aluminum garnet (YAG) phosphor, a β-sialon:Eu green phosphor, a $CaAlSiN_3$:Eu red phosphor, $SrGa_2S_4$:$Eu^{2+}$ green phosphor, a $K_2SiF_6$:$Mn^{4+}$ red phosphor, other suitable phosphorescent material, or a combination of any two or more of these phosphorescent materials.

Phosphor material 136 may include one or more phosphors that absorb light in the ultraviolet and blue portion of the spectrum. Thus, a portion of the light emitted by light-emitting diode dies 130-1 and 130-2 will be absorbed and re-emitted by phosphorescent material 136. Another portion of the light will pass through material 134 and will exit window 138 without being absorbed by phosphorescent material 136. Light from ultraviolet light-emitting diode die 130-1 that escapes window 138 without being absorbed has a relatively low blue component, resulting in a relatively warm white. Light from blue light-emitting diode die 130-2 that escapes window 138 without being absorbed has a relatively high blue component, resulting in a relatively cool white.

Because ultraviolet light-emitting diode 130-1 emits less blue light than blue light-emitting diode 130-2, control circuitry 30 may adjust the warmth of white emitted from backlight structures 88 by adjusting the relative intensities of light from light-emitting diodes 130-1 and 130-2.

Control circuitry 30 may control the intensity of light emitted from each light-emitting diode 82 by adjusting the power supply signals that are supplied across the positive and negative terminals for each diode 130-1 and 130-2. Light-emitting diodes 82 may be mounted on a substrate such as substrate 108. Substrate 108 may be a dielectric material. For example, substrate 108 may be a rigid printed circuit board (e.g., a printed circuit board formed from fiberglass-filled epoxy such as an FR4 board) or may be a flexible printed circuit (e.g., a printed circuit formed from a flexible sheet of polyimide or a layer of other flexible polymer). Metal traces such as illustrative traces 142 of FIG. 10 may be formed on substrate 108 to provide power to the terminals of light-emitting diodes 82.

Figure 11:
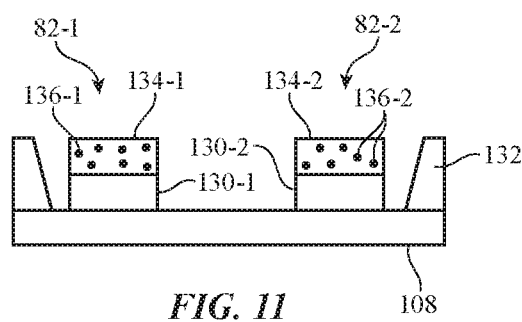
FIG. 11 is a top view of an illustrative light source semiconductor package that includes blue and ultraviolet light-emitting diode dies and separate phosphor layers in accordance with an embodiment.

The example of FIG. 10 in which both light-emitting diode dies 130-1 and 130-2 are covered with the same phosphorescent material 136 is merely illustrative. If desired, light-emitting diode dies 130-1 and 130-2 may be covered with separate phosphor layers, as shown in FIG. 11. As shown in FIG. 11, ultraviolet light-emitting diode die 130-1 may be covered with material 134-1 containing a first phosphorescent material 136-1 and blue light-emitting diode die 130-2 may be covered with material 134-2 containing a second phosphorescent material 136-2. Individual phosphor coatings of the type shown in FIG. 11 may be formed by applying a conformal coating to individual light-emitting diode dies, by coating a separate substrate that is bonded onto the light-emitting diode dies, or using other suitable methods.

The use of individual phosphor coatings allows for different phosphor materials to be used on each light-emitting diode die, if desired. For example, phosphorescent material 136-1 may be a combination of red and green phosphors, whereas phosphorescent material 136-2 may be a yellow phosphor. This is, however, merely illustrative. If desired, phosphorescent materials 136-1 and 136-2 may include other combinations of phosphors or may include the same phosphors.

Figure 12:
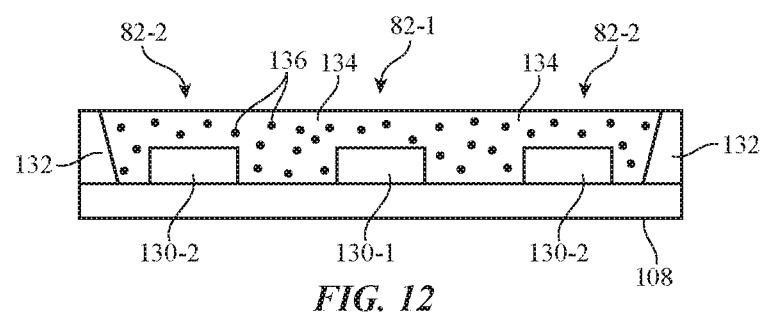
FIG. 12 is a top view of an illustrative light source semiconductor package that includes an ultraviolet light-emitting diode die between two blue light-emitting diode dies with a shared phosphor layer in accordance with an embodiment.
Figure 13:
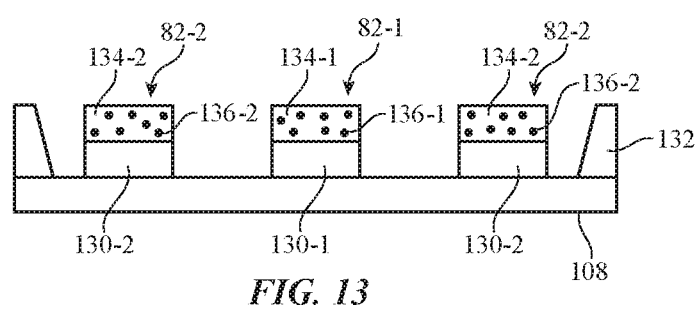
FIG. 13 is a top view of an illustrative light source semiconductor package that includes an ultraviolet light-emitting diode die between two blue light-emitting diode dies with separate phosphor layers in accordance with an embodiment.

FIGS. 12 and 13 illustrate examples in which more than two light-emitting diode dies are mounted in the same package 132. In these examples, each package 132 includes an ultraviolet light-emitting diode die 130-1 interposed between first and second blue light-emitting diode dies 130-2. This type of arrangement may provide increased symmetry and better light mixing. In the example of FIG. 12, all three light-emitting diodes are covered with the same phosphorescent material 136. In the example of FIG. 13, each light-emitting diode is covered with a discrete phosphor layer, thus allowing for phosphor material 136-1 of light source 82-1 to be different from phosphor material 136-2 of light source 82-2, if desired.

Figure 14:
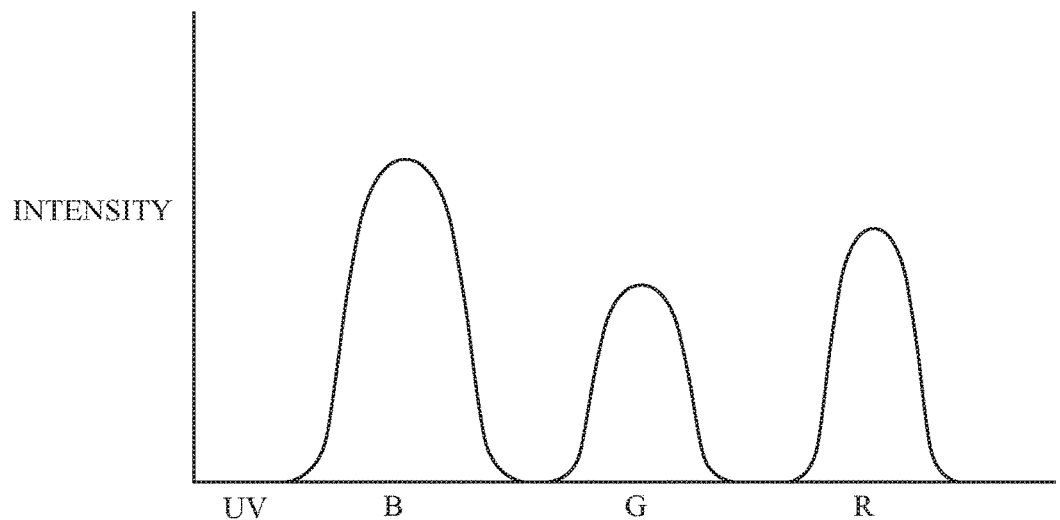
FIG. 14 is a graph showing an illustrative spectrum that may be produced by a display when blue light-emitting diode dies in the backlight are turned on and ultraviolet light-emitting diode dies in the backlight are turned off in accordance with an embodiment.
Figure 15:
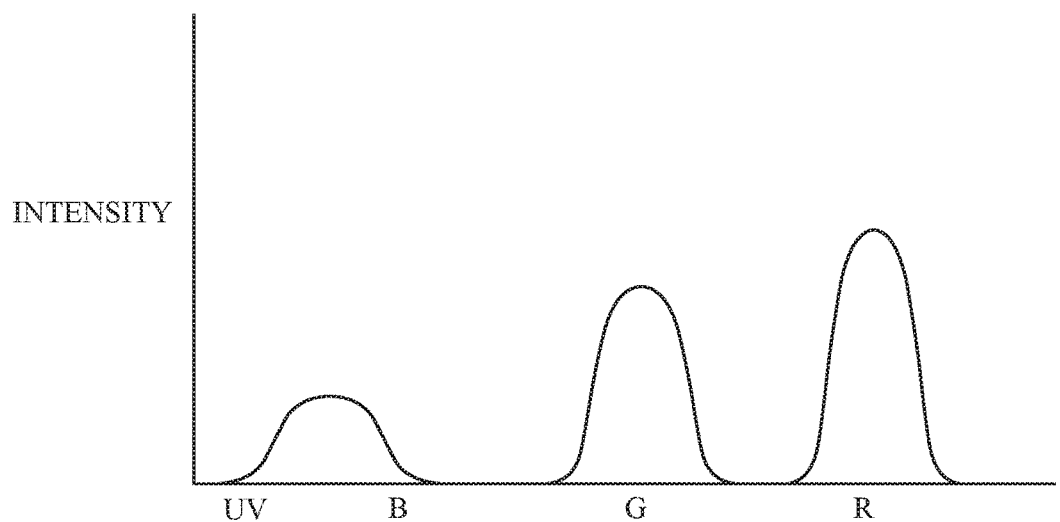
FIG. 15 is a graph showing an illustrative spectrum that may be produced by a display when ultraviolet light-emitting diode dies in the backlight are turned on and blue light-emitting diode dies in the backlight are turned off in accordance with an embodiment.

FIGS. 14 and 15 illustrate the display spectrum of display 14 using light sources 82-1 and 82-2 of the type described in connection with FIGS. 10-13. FIG. 14 illustrates the display spectrum of display 14 when cool light sources 82-2 are turned on, warm light sources 82-1 are turned off, and the input pixel values are equal to a maximum value (e.g., when R=G=B=255). FIG. 15 illustrates the display spectrum of display 14 when warm light sources 82-1 are turned on, cool light sources 82-2 are turned off, and the input pixel values are equal to a maximum value (e.g., when R=G=B=255).

As shown in FIG. 14, the white spectrum of display 14 when using cool light source 82-2 includes a relatively high blue component B compared to green component G and red component R. The high blue component results from the portion of light that is emitted from blue light-emitting diode die 130-2 that is not absorbed by phosphor material 136 (or 136-2). Since the light from blue light-emitting diode 130-2 is blue, the light that escapes package 132 without being absorbed results in the strong blue component B of the display spectrum.

As shown in FIG. 15, the white spectrum of display 14 when using warm light source 82-1 includes a relatively low blue component B compared to green component G and red component R. This low blue component results from the portion of light that is emitted from ultraviolet light-emitting diode die 130-1 that is not absorbed by phosphor material 136 (or 136-1). Since the light from ultraviolet light-emitting diode 130-2 is ultraviolet light with a low blue component, the blue transmittance through the blue color filters of display 14 will be relatively low compared to the red and green channels. Any ultraviolet light that escapes through the color filters of display 14 will not affect the displayed colors since this light is not visible to the human eye. Control circuitry 30 may therefore adjust the color of backlight by adjusting the intensity ratio of light emitted from ultraviolet light-emitting diode 82-1 and light emitted from blue light-emitting diode 82-2.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
    a display having a backlight and a pixel array, wherein the backlight includes:
        a light guide layer having first and second opposing surfaces;
        light sources that emit light into the light guide layer; and
        a reflector that covers the second surface of the light guide layer and that reflects the light towards the first surface; and
    a color ambient light sensor that measures a color of ambient light, wherein the ambient light originates from outside of the electronic device; and
    control circuitry that adjusts a color temperature of light from the light sources based on the color of ambient light to shift a white point of the display between a warm white and a cool white.

2. The electronic device defined in claim 1 wherein the light sources comprise a first light source that produces light of a first color and a second light source that produces light of a second color that is different from the first color.

3. The electronic device defined in claim 2 wherein the control circuitry adjusts the intensity of light produced by the first light source relative to the intensity of light produced by the second light to shift the white point of the display between the warm white and the cool white based on the color of ambient light.

4. The electronic device defined in claim 2 wherein the first color of light has a color temperature that is less than 6,500 K and the second color of light has a color temperature that is greater than 6,500 K.

5. The electronic device defined in claim 2 wherein the first light source comprises a first light-emitting diode and the second light source comprises a second light-emitting diode.

6. The electronic device defined in claim 5 wherein the first light-emitting diode comprises an ultraviolet light-emitting diode die and the second light-emitting diode comprises a blue light-emitting diode die.

7. The electronic device defined in claim 6 wherein the ultraviolet light-emitting diode die and the blue light-emitting diode die are coated with red and green phosphors.

8. The electronic device defined in claim 6 wherein the ultraviolet light-emitting diode die is coated with red and green phosphors and the blue light-emitting diode die is coated with a yellow phosphor.

9. The electronic device defined in claim 6 wherein the first and second light-emitting diodes are mounted in a common semiconductor package.

10. The electronic device defined in claim 6 wherein the color of light produced by the first light source has a lower color temperature than the color of light produced by the second light source.

11. An electronic device, comprising:
    a display having a backlight and having a pixel array that receives light from the backlight, wherein the backlight comprises light sources that generate the light and wherein the light generated by the light sources is the only light received by the pixel array from the backlight, wherein the light sources include first and second light sources, and wherein the first light source produces light having a first color temperature and the second light source produces light having a second color temperature that is higher than the first color temperature;
    a color ambient light sensor that measures a color of ambient light, wherein the ambient light originates from outside of the electronic device; and
    control circuitry that adjusts a color temperature of the light from the light sources based on the color of ambient light by adjusting the intensity of light produced by the first light source relative to the intensity of light produced by the second light source to shift a color cast of the display between a warm color cast and a cool color cast.

12. The electronic device defined in claim 11 wherein the control circuitry increases the intensity of light produced by the first light source relative to the intensity of light produced by the second light source when the color of ambient light has a color temperature that is closer to the first color temperature than the second color temperature.

13. The electronic device defined in claim 11 wherein the control circuitry increase the intensity of light produced by the second light source relative to the intensity of light produced by the first light source when the color of ambient light has a color temperature that is closer to the second color temperature than the first color temperature.

14. The electronic device defined in claim 11 further comprising a third light source that produces light having a third color temperature that is different from the first and second color temperatures.

15. The electronic device defined in claim 14 wherein the first, second, and third light sources each comprise at least one light-emitting diode, and wherein the control circuitry is configured to adjust the relative intensities of light produced by the first, second, and third light sources to shift the color cast of the display between the warm color cast and the cool color cast based on the color of ambient light.

16. An electronic device, comprising:
- a display having a backlight and having a pixel array that receives light from the backlight, wherein the backlight includes a light guide layer, first and second light sources that emit the light into the light guide layer, and a reflective material covering a lower surface of the light guide layer, and wherein the first light source comprises an ultraviolet light-emitting diode die and the second light source comprises a blue light-emitting diode die;
- a color ambient light sensor that measures a color of ambient light, wherein the ambient light originates from outside of the electronic device; and
- control circuitry that adjusts a color temperature of the light from the backlight based on the color of ambient light by adjusting the intensity of light emitted from the first light source relative to the intensity of light emitted from the second light source to shift a white point of the display between a warm white and a cool white.

17. The electronic device defined in claim 16 wherein the ultraviolet light-emitting diode die and the blue light-emitting diode die are mounted in a common semiconductor package.

18. The electronic device defined in claim 17 wherein the ultraviolet light-emitting diode die and the blue light-emitting diode die are coated with a phosphor.

19. The electronic device defined in claim 17 wherein the ultraviolet light-emitting diode die is coated with a first phosphor and the blue light-emitting diode die is coated with a second phosphor that is different from the first phosphor.

20. The electronic device defined in claim 17 wherein the backlight includes a third light source comprising an additional blue light-emitting diode die, wherein the ultraviolet light-emitting diode die is interposed between the blue light-emitting diode die and the additional blue light-emitting diode die in the semiconductor package.

* * * * *